United States Patent
Nair

(10) Patent No.: US 9,803,050 B2
(45) Date of Patent: Oct. 31, 2017

(54) DISPERSANT FOR USE IN SYNTHESIS OF POLYARYLETHERKETONES

(71) Applicant: Ticona LLC, Florence, KY (US)

(72) Inventor: Kamlesh P. Nair, Florence, KY (US)

(73) Assignee: Ticona LLC, Florence, KY (US)

( * ) Notice: Subject to any disclaimer, the term of this patent is extended or adjusted under 35 U.S.C. 154(b) by 14 days.

(21) Appl. No.: 14/867,056

(22) Filed: Sep. 28, 2015

(65) Prior Publication Data

US 2016/0102173 A1    Apr. 14, 2016

Related U.S. Application Data

(60) Provisional application No. 62/061,438, filed on Oct. 8, 2014.

(51) Int. Cl.
| | |
|---|---|
| *C08G 61/12* | (2006.01) |
| *C08L 71/00* | (2006.01) |
| *C08G 65/00* | (2006.01) |
| *C08K 7/02* | (2006.01) |
| *C08G 65/40* | (2006.01) |

(52) U.S. Cl.
CPC ........... *C08G 65/00* (2013.01); *C08G 61/127* (2013.01); *C08G 65/4093* (2013.01); *C08K 7/02* (2013.01); *C08L 71/00* (2013.01); *C08G 2261/3442* (2013.01); *C08G 2261/45* (2013.01)

(58) Field of Classification Search
None
See application file for complete search history.

(56) References Cited

U.S. PATENT DOCUMENTS

| | | | |
|---|---|---|---|
| 3,956,240 A | 5/1976 | Dahl et al. | |
| 4,320,224 A * | 3/1982 | Rose | C08G 61/127 528/125 |
| 4,396,755 A | 8/1983 | Rose | |
| 4,687,833 A * | 8/1987 | Clendinning | C08G 65/4012 528/125 |
| 4,698,393 A | 10/1987 | Jansons et al. | |
| 4,709,007 A | 11/1987 | Jansons et al. | |

(Continued)

FOREIGN PATENT DOCUMENTS

GB    2 287 031 A    9/1995

OTHER PUBLICATIONS

Abstract of Article—Diez-Pacual et al., "High-performance nanocomposites based on polyetherketones," *Progress in Materials Science*, vol. 57, Issue 7, Sep. 2012, pp. 1106-1190.

(Continued)

*Primary Examiner* — Peter A Salamon
(74) *Attorney, Agent, or Firm* — Dority & Manning, P.A.

(57) ABSTRACT

A method for forming a polyaryletherketone is described. More particularly, a reaction mixture is initially supplied to the reactor vessel that contains one or more precursor monomers. A heteroaryl compound is also added to the reaction mixture. The reaction can be carried out according to, e.g., an electrophilic aromatic substitution reaction or a nucleophilic aromatic substitution reaction. The heteroaryl compound can serve as a dispersant to the polymer as it is formed. This minimizes the likelihood of gelling of the product polymer within the reactor vessel and limits the impact of process disruptions on the production of the polyaryletherketone.

21 Claims, 1 Drawing Sheet

(56) References Cited

U.S. PATENT DOCUMENTS

| | | | | |
|---|---|---|---|---|
| 4,731,429 | A | * | 3/1988 | McMaster ............... C08L 71/00 528/125 |
| 4,767,838 | A | * | 8/1988 | Clendinning ........... C08G 65/48 525/471 |
| 4,774,296 | A | * | 9/1988 | Clendinning ...... C08G 65/4012 525/471 |
| 4,774,311 | A | * | 9/1988 | Kelsey ............... C08G 65/4087 528/125 |
| 4,786,694 | A | * | 11/1988 | Clendinning ...... C08G 65/4012 525/471 |
| 4,816,556 | A | | 3/1989 | Gay et al. |
| 4,820,790 | A | * | 4/1989 | Winslow ............ C08G 61/127 528/125 |
| 4,841,013 | A | | 6/1989 | Towle |
| 4,861,915 | A | * | 8/1989 | Clendinning ...... C08G 65/4012 568/328 |
| 4,891,167 | A | * | 1/1990 | Clendinning ...... C08G 65/4012 528/125 |
| 4,912,181 | A | | 3/1990 | Becker et al. |
| 5,602,226 | A | * | 2/1997 | Lubowitz ............... C07C 67/14 524/700 |
| 5,612,451 | A | * | 3/1997 | Heitz ................. C08G 61/127 528/222 |
| 5,734,005 | A | | 3/1998 | Daniels et al. |
| 5,739,256 | A | * | 4/1998 | Lubowitz ............. C08G 63/185 252/183.11 |
| 6,069,223 | A | | 5/2000 | Liggat et al. |
| 7,160,980 | B2 | | 1/2007 | Devine et al. |
| 7,608,648 | B2 | | 10/2009 | Meakin et al. |
| 7,837,896 | B2 | | 11/2010 | Flath et al. |
| 7,875,234 | B2 | | 1/2011 | Richter et al. |
| 7,906,574 | B2 | | 3/2011 | Meakin et al. |
| 8,129,462 | B2 | | 3/2012 | Hsu et al. |
| 8,501,896 | B2 | | 8/2013 | Hay et al. |
| 9,023,468 | B2 | | 5/2015 | Towle |
| 9,062,163 | B2 | | 6/2015 | Wang et al. |
| 2007/0238853 | A1 | | 10/2007 | Hay et al. |
| 2009/0048373 | A1 | * | 2/2009 | Clauss ................. B41M 5/267 524/86 |
| 2009/0117356 | A1 | | 5/2009 | Hsu et al. |
| 2009/0131582 | A1 | | 5/2009 | Grant et al. |
| 2010/0113688 | A1 | | 5/2010 | Hsu et al. |
| 2011/0206880 | A1 | | 8/2011 | Wang et al. |
| 2014/0322441 | A1 | | 10/2014 | Mathieu et al. |
| 2015/0183918 | A1 | * | 7/2015 | Le ........................ C08G 61/127 528/125 |
| 2016/0102173 | A1 | * | 4/2016 | Nair ...................... C08G 65/00 523/122 |

OTHER PUBLICATIONS

International Search Report and Written Opinion for PCT/US2015/052566 dated Jan. 13, 2016, 12 pages.
Abstract of Chinese Patent—CN101831177, Sep. 15, 2010, 2 pages.
Machine Translation of CN101812170 B, Oct. 12, 2011, 16 pages.
Machine Tranidation of CN202744481 U, Feb. 20, 2013, 8 pages.
Machine Translation of CN202744482 U, Feb. 20, 2013, 7 pages.

* cited by examiner

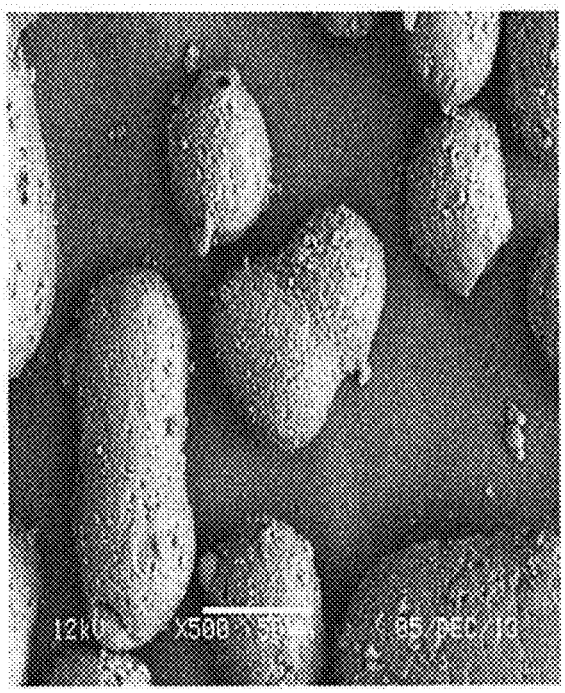

DISPERSANT FOR USE IN SYNTHESIS OF POLYARYLETHERKETONES

RELATED APPLICATIONS

The present application claims priority to U.S. Provisional Application Ser. No. 62/061,438, filed on Oct. 8, 2014, which is incorporated herein in its entirety by reference thereto.

BACKGROUND OF THE INVENTION

Polyaryletherketones (PAEKs) are high-performance engineering thermoplastic polymers that possess high temperature stability, excellent electrical insulating properties at high temperatures, good chemical resistance, and high mechanical strength. PAEKs may be amorphous or semi-crystalline, and when burned exhibit low toxicity and corrosive fumes. The materials are of interest for use in biomedical applications such as implant formations as well as the aerospace industry, for instance in interior aviation applications.

PAEKs are characterized by phenylene rings linked via oxygen bridges that include ether and carbonyl (ketone) groups. The ratio and sequence of the ether ("E") and ketone ("K") linkages can affect the glass transition temperature and melting point of the thermoplastic polymer as well as the heat resistance and processing temperature. For instance, a polymer possessing a higher ratio of 1,4-phenylene di-ketone linkages (e.g., PEKK) will generally be more rigid and exhibit a higher glass transition temperature and melting point as compared to a polymer possessing a higher ratio of 1,4-phenylene di-ether linkages (e.g., PEEK).

PAEKs are generally formed according to either a nucleophilic aromatic substitution polymerization scheme or an electrophilic aromatic substitution polymerization scheme. Unfortunately, problems exist with both schemes. For instance when utilizing an electrophilic aromatic substitution reaction (e.g., a Friedel-Crafts reaction), the reaction product is prone to precipitation and gelation, particularly at higher conversions, resulting in a large mass of the gelled polymer in the reactor. This material is very difficult to handle and results in increased production costs as well as lower product quality. Typically such a gelled mass has to be finely ground for the subsequent purification processes which are important to remove the catalyst residues and may add to the cost of manufacture of the polymer. Meanwhile, the nucleophilic aromatic substitution reaction requires high temperatures that can promote side reactions and formation of undesired by-products that are difficult to separate from the desired PAEK affecting purity, color, and melt stability of the final product. Furthermore the nucleophilic process involves the use of fluorinated monomers which add to the expense of the product.

As such, a need exists for PAEK formation methods and materials that can produce the polymer in a more suitable particulate form to provide for formation of high purity materials at lower cost circumventing the tedious size reduction grinding processes to facilitate easier and more effective polymer purification.

SUMMARY OF THE INVENTION

In accordance with one embodiment of the present disclosure, a method for forming a polyaryletherketone (PAEK) is disclosed. The method comprises supplying one or more monomers to a reactor vessel, optionally in the presence of a catalyst, wherein the monomer(s) are precursors for the polyarylene ether ketone; and introducing a heteroaryl compound or a salt, derivative or adduct of the heteroaryl compound into the reactor vessel. The heteroaryl compound can generally have a molecular weight of about 2,000 grams per mole or less.

Thermoplastic compositions formed of the PAEK as well as shaped articles formed of the thermoplastic composition are also disclosed herein.

Other features and aspects of the present invention are set forth in greater detail below.

BRIEF DESCRIPTION OF THE DRAWINGS

A full and enabling disclosure of the subject matter, including the best mode thereof, directed to one of ordinary skill in the art, is set forth more particularly in the remainder of the specification, which makes reference to the appended figure in which FIG. 1 is a scanning electron micrograph of PAEK polymer formed as described herein.

DETAILED DESCRIPTION

It is to be understood that the terminology used herein is for the purpose of describing particular embodiments only and is not intended to limit the scope of the present invention.

"Acyl" refers to the groups H—C(O)—, alkyl-C(O)—, alkenyl-C(O)—, cycloalkyl-C(O)—, aryl-C(O)—, heteroaryl-C(O)—, and heterocyclic-C(O)—. Acyl includes the "acetyl" group $CH_3C(O)$—.

"Acylamino" refers to the groups —NHC(O)alkyl, —NHC(O)alkenyl, —NHC(O)cycloalkyl, —NHC(O)aryl, —NHC(O)heteroaryl, and —NHC(O)heterocyclic. Acylamino includes the "acetylamino" group —NHC(O)$CH_3$.

"Acyloxy" refers to the groups alkyl-C(O)O—, alkenyl-C(O)O—, aryl-C(O)O—, cycloalkyl-C(O)O—, heteroaryl-C(O)O—, and heterocyclic-C(O)O—. Acyloxy includes the "acetyloxy" group $CH_3C(O)O$—.

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Alkoxy" refers to the group —O-alkyl. Alkoxy includes, by way of example, methoxy, ethoxy, n-propoxy, iso-propoxy, n-butoxy, t-butoxy, sec-butoxy, and n-pentoxy.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3$)$_2$CH), n-butyl ($CH_3CH_2CH2CH_2$), isobutyl (($CH_3$)$_2$CHCH$_2$), sec-butyl (($CH_3$)($CH_3CH_2$)CH), t-butyl (($CH_3$)$_3$C), n-pentyl ($CH_3CH_2CH_2CH_2CH_2$), and neopentyl (($CH_3$)$_3$CCH$_2$).

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and Spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Aryloxy" refers to the group —O-aryl, which includes, by way of example, phenoxy and naphthyloxy.

"Carboxyl" or "carboxy" refers to —COOH or salts thereof.

"Carboxyl ester" or "carboxy ester" refers to the groups —C(O)O-alkyl, C(O)O-alkenyl, C(O)O-aryl, C(O)O cycloalkyl, —C(O)O-heteroaryl, and —C(O)O-heterocyclic.

"Cycloalkyl" refers to a saturated or partially saturated cyclic group of from 3 to 14 carbon atoms and no ring heteroatoms and having a single ring or multiple rings including fused, bridged, and Spiro ring systems. For multiple ring systems having aromatic and non-aromatic rings that have no ring heteroatoms, the term "cycloalkyl" applies when the point of attachment is at a non-aromatic carbon atom (e.g., 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C< ring unsaturation.

"Cycloalkyloxy" refers to —O cycloalkyl.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties.

"Heteroaryloxy" refers to —O-heteroaryl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

"Heterocyclyloxy" refers to the group —O-heterocycyl.

It should be understood that the aforementioned definitions encompass unsubstituted groups, as well as groups substituted with one or more other functional groups as is known in the art. For example, an aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester) amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

The present discussion is a description of exemplary embodiments only, and is not intended as limiting the broader aspects of the present invention.

Generally speaking, the present invention is directed to a method for preventing agglomeration and/or gelation of a PAEK with itself as well as with reaction by-products as it is formed in the reactor vessel. More particularly, a reaction mixture may be initially supplied to a reactor vessel that contains one or more precursor monomers. The reaction mixture may be heated or cooled as necessary during initiation of the polymer formation, generally depending upon the polymerization scheme utilized to form the PAEK. Either in conjunction with a monomer or after a certain period of time, a dispersant that is a heteroaryl compound or a salt, derivative or adduct thereof can be added to the reaction mixture. The heteroaryl dispersant can be utilized alone or optionally in conjunction with previously known dispersants.

Use of the heteroaryl dispersant can prevent agglomeration and gelation of polymer during PAEK polymerization processes and can prevent agglomeration of the nascent polymer with byproducts that may be formed in conjunction with the polymer. Thus, through utilization of the dispersant during polymer formation, the polymer can be more easily purified and the process can be carried out more economically. Moreover, use of the dispersant can be easily incorporated into existing PAEK formation processes without need of any expensive processing components or excessive processing time that would detrimentally affect the cost savings provided by use of the dispersants.

The total molecular weight of the dispersant compound (e.g., the weight of a single dispersant or the total weight of a combination of dispersants) can be relatively low in some embodiments so that it so that it can effectively serve as a dispersant for the polymer composition and can be easily removed from the product following the formation process, if desired, hence it may be beneficial in some embodiments to use non-polymeric dispersant agents. In this regard, the heteroaryl compound can have a molecular weight of from about 2,000 grams per mole or less, in some embodiments from about 25 to about 1,000 grams per mole, in some embodiments from about 50 to about 500 grams per mole, and in some embodiments, from about 100 to about 400 grams per mole.

The heteroaryl compound includes a heteroaryl group. Examples of heteroaryl groups may include, for instance, pyrrole, imidazole, pyrazole, oxazole, isoxazole, thiazole, isothiazole, triazole, furazan, oxadiazole, tetrazole, pyridine, diazine, oxazine, triazine, tetrazine, and so forth. If desired, the ring structure of the heteroaryl group may also be substituted with one or more functional groups, such as acyl, acyloxy, acylamino, alkoxy, alkenyl, alkyl, amino, aryl, aryloxy, carboxyl, carboxyl ester, cycloalkyl, cycloalkyloxy, hydroxyl, halo, haloalkyl, heterocyclyl, heterocyclyloxy, etc. Substitution may occur at a heteroatom and/or a carbon atom of the ring structure. For instance, a heteroaryl compound may include a nitrogen-containing heteroaryl group in which one or more of the carbon atoms in the ring structure are substituted by nitrogen. One particularly suitable heteroaryl group is a triazine, which contains three nitrogen atoms in the ring structure, e.g., a substituted or unsubstituted 1,2,3-triazene, 1,2,4-triazene, or 1,3,5-triazene.

The heteroaryl compound may have the general structure provided below in Formula (I):

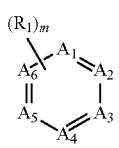
(I)

or a salt, derivative or adduct thereof, wherein, the ring is a 6-membered aromatic ring wherein $A_1$, $A_2$, $A_3$, $A_4$, $A_5$, and $A_6$ are each independently carbon, nitrogen or oxygen, with the proviso that at least 3 of $A_1$, $A_2$, $A_3$, $A_4$, $A_5$, and $A_6$ are carbon atoms, wherein each nitrogen is optionally oxidized, and wherein the ring may be optionally fused or linked to a 5- or 6-membered aryl, heteroaryl, cycloalkyl, or heterocyclyl;

$R_1$ is acyl, acyloxy (e.g., acetyloxy), acylamino (e.g., acetylamino), alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocyclyloxy;

m is from 0 to 4, in some embodiments from 0 to 3, in some embodiments from 0 to 2, and in some embodiments, from 0 to 1; and when the compound is in the form of a metal salt, suitable metal counterions may include transition metal counterions (e.g., copper, iron, etc.), alkali metal counterions (e.g., potassium, sodium, etc.), alkaline earth metal counterions (e.g., calcium, magnesium, etc.), and/or main group metal counterions (e.g., aluminum).

The heteroaryl compound may have the general structure provided below in Formula (II) or (III) or mixtures thereof:

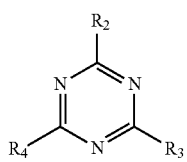
(II)

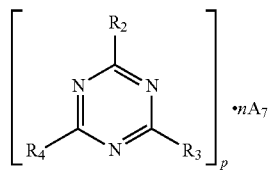
(III)

wherein, $R_2$, $R_3$, $R_4$ are, independently, hydrogen; $C_1$-$C_8$ alkyl; $C_5$-$C_{16}$-cycloalkyl or alkylcycloalkyl, optionally substituted with a hydroxy or a $C_1$-$C_4$ hydroxyalkyl; $C_2$-$C_8$ alkenyl; $C_1$-$C_8$ alkoxy, acyl, or acyloxy; $C_6$-$C_{12}$-aryl or arylalkyl; $OR_5$ or $N(R_5)R_6$, wherein $R_5$ is hydrogen, $C_1$-$C_8$ alkyl, $C_5$-$C_{16}$ cycloalkyl or alkylcycloalkyl, optionally substituted with a hydroxy or a $C_1$-$C_4$ hydroxyalkyl, $C_2$-$C_8$ alkenyl, $C_1$-$C_8$ alkoxy, acyl, or acyloxy, or $C_6$-$C_{12}$ aryl or arylalkyl; and $R_6$ is identical to $R_5$ or O—$R_5$;

p is from 1 to 4;

n is from 1 to 4;

$A_7$ is an acid that can form adducts with triazine compounds of the formula III, e.g., acetic acid or hydrochloric acid.

Particular heteroaryl compounds can include, without limitation, cyanuric acid:

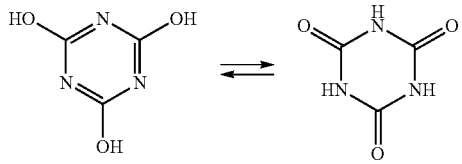 [SMILES: Oc1nc(O)nc(O)n1 ; O=c1[nH]c(=O)[nH]c(=O)[nH]1]

melamine triacetate:

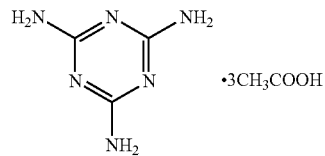

melamine hydrochloride:

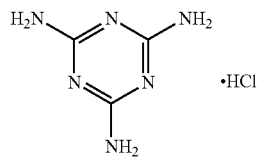

as well as mixtures thereof.

The heteroaryl compound may be employed in a variety of different forms as is known in the art, such as in the form of a powder, solution, slurry, molten, etc. In addition, mixtures of heteroaryl compounds may be employed. Regardless of its form, the relative amount of the heteroaryl compound added to the reaction mixture may be selected to help achieve the desired dispersal of the formed polymer. In most embodiments, for example, the heteroaryl compound (or a mixture of heteroaryl compounds optionally in conjunction with one or more traditional dispersants) can be employed in an amount of from about 0.05 moles to about 5 moles of the heteroaryl compound per mole of the halide-containing monomers, or from about 0.1 moles to about 3 moles of the heteroaryl compound per mole of the halide-containing monomers. For instance, a reaction mixture may include the heteroaryl compound in an amount of from about 0.1 wt. % to about 10 wt. %, in some embodiments from about 0.2 wt. % to about 5 wt. %, and in some embodiments, from about 0.3 wt. % to about 4 wt. % relative to the weight of the reaction mixture absent the solvent.

In one embodiment, the heteroaryl compound may be utilized in conjunction with other traditional dispersants. For instance, a traditional dispersant as may be utilized in conjunction with the heteroaryl compound can have the general structure of:

(i) $R_5(OX)_a$
(ii) $R_5(COOX)_a$
(iii) $R_5(SO_3X)_a$, or
(iv) $(R_5O)_bY$ in which:

$R_5$ is an organic group compatible with the monomer(s) and the other components of the reaction medium;
each X independently is a hydrogen atom or a monovalent metal atom;
each a independently is 1 or 2;
Y is a multivalent metal atom; and
b is an integer equal to the valency of Y.

$R_5$ may be, for example, a monofunctional or (where appropriate) difunctional aliphatic aromatic or heterocyclic group, for example a substituted or unsubstituted alkyl, alkylene, aryl, arylene, alkaryl or aralkyl group. For example, $R_5$ can include alkyl and alkylene groups, such as n-alkyl and n-alkylene groups, as well as phenyl groups, naphthyl groups, phenylene groups, or naphthylene groups. In one embodiment $R_5$ can be a substituted or unsubstituted aryl group, or linear or branched alkyl group, or their arylene or alkylene equivalents where appropriate. By way of example, $R_5$ can be a $C_1$ to $C_5$ alkyl group, e.g., a methyl, ethyl, propyl, isopropyl, n-butyl or isobutyl group; or an unsubstituted aryl group, e.g., a phenyl or naphthyl group. Aryl $R_5$ groups can be deactivated to electrophilic attack by attachment of electron-withdrawing groups.

In those embodiments in which a heteroaryl compound is utilized in conjunction with a traditional dispersant of the formula $R_5(OX)_a$, the traditional dispersant may be an alcohol, which also encompasses dials. The traditional dispersant may optionally be an organic metal oxide where X is, for example, an alkali metal such as sodium.

In those embodiments in which a heteroaryl compound is utilized in conjunction with a traditional dispersant of the formula $R_5(COOX)_a$, the traditional dispersant may be a carboxylic acid $R_5$—COOH, which includes dicarboxylic acids XOOC—R—COOX, or metal salts thereof where X is, for example an alkali metal.

In those embodiments in which a heteroaryl compound is utilized in conjunction with a traditional dispersant of the formula $(R_5$—$O)_bY$, Y can be a di- or trivalent metal atom and b can be 2, 3 or 4 respectively e.g., $(RO)_3Al$, $(RO)_4Ti$, $(RO)_2Zn$, etc.

A traditional dispersant can generally include fewer than 8 aliphatic carbon atoms, or even fewer than 5 aliphatic carbon atoms, directly bonded to one another.

Some specific examples of traditional dispersants and may be utilized in conjunction with a heteroaryl compound include, without limitation, methanol, ethanol, isopropanol, butanol, acetic acid, propionic acid, butanoic acid, trichloroacetic acid, trifluoroacetic acid, methane sulphonic acid, succinic acid, sodium methoxide, sodium ethoxide, $(CH_3CH_2O)_3Al$, $(CH_3COO)_3Al$, pentafluorophenol, and benzoic acid.

Any of a variety of different PAEKs may be formed in accordance with the present invention, including blends of different PAEKs.

By way of example, a PAEK can have the general formula of (IV) or (V):

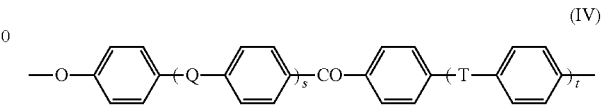
(IV)

wherein Q and T are each independently —O— or —CO—;
s and t are each independently 0, 1, 2, or 3;

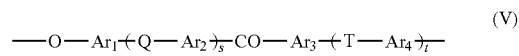
(V)

wherein $Ar_1$, $Ar_2$, $Ar_3$, $Ar_4$ are each independently m-phenylene, p-phenylene, biphenylene or naphthylene or a substituted or derivative thereof;
Q and T are each independently —O— or —CO—;
s and t are each independently 0, 1, 2, or 3.

Representatives of repeat units as may be included on a PAEK include the following:

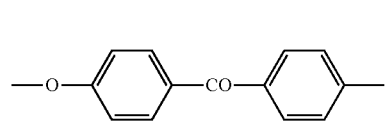
(PEK)

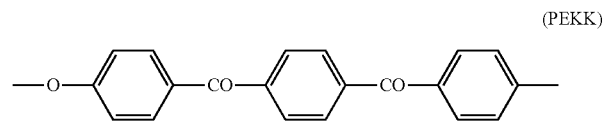
(PEKK)

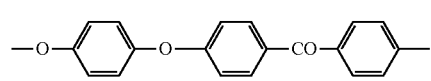
(PEEK)

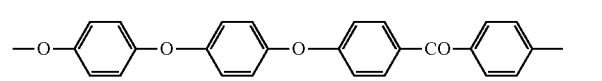
(PEEEK)

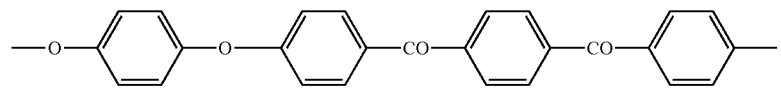

(PEEKK)

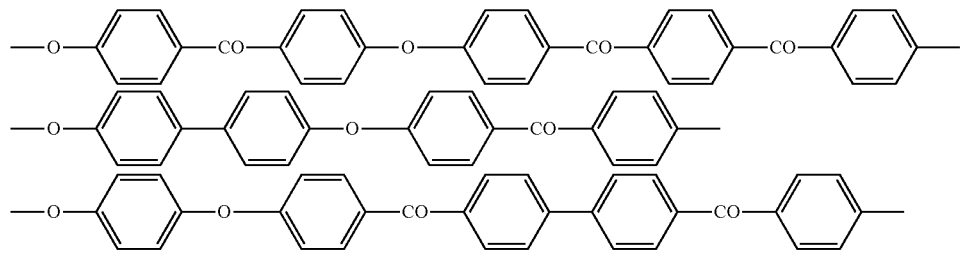

(PEKEKK)

The disclosed dispersants can be particularly useful in forming PEKK.

The PAEKs can be formed according to an electrophilic aromatic substitution reaction. According to this reaction scheme, a hydrogen of an aromatic monomer is replaced by an electrophile, generally in the presence of an excess of a Lewis acid catalyst. The general scheme can be represented by the following general reaction equations (1)-(3):

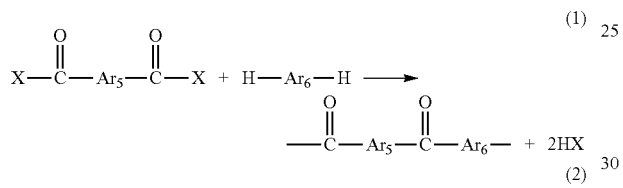

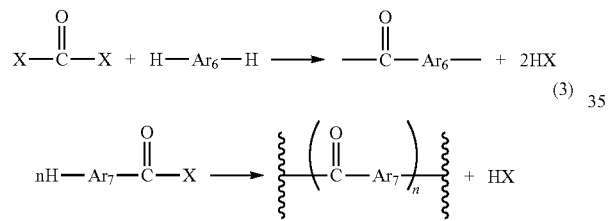

wherein X is a halogen and $Ar_5$, $Ar_6$, and $Ar_7$ are each divalent aromatic radicals such as those of formula (IV) and/or formula (V) described above selected to include the repeat units of the desired PAEK.

By way of example, a PEKK polymer may be formed by reaction of a diphenyl ether with a suitable acid chloride, e.g., terephthaloyl chloride, isophthaloyl chloride, etc. according to the following reaction scheme (4):

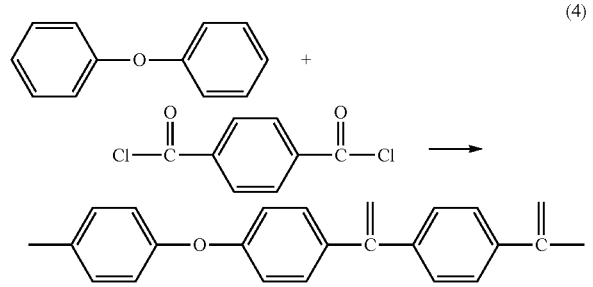

Reactants for use in the reaction scheme can include PEK oligomers such as an EKKE oligomer or the like. For instance, a diphenyl ether can first be reacted with a suitable acid chloride to form an oligomer possessing 1,4-phenylene di-ketone linkages and/or 1,4-phenylene di-ether linkages and this oligomer can then be utilized in one of the above reaction schemes in formation of the polymer. When utilized in a reaction scheme, an oligomer can generally include about 10 monomer units or less, for instance about 5 monomer units or less in one embodiment.

Carbonyl halides, e.g., acid chlorides, as may be utilized in an electrophilic aromatic substitution reaction scheme having the general formula

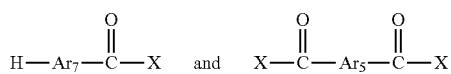

can include divalent aromatic radicals $Ar_5$, $Ar_7$ including, without limitation,

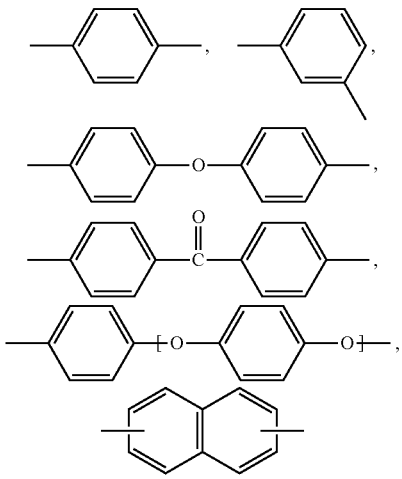

The second monomer of the electrophilic aromatic substitution reaction, when present, can be, for example and without limitation, diphenyl ether, 4,4'-diphenoxybenzophenone, 1,4-diphenoxybenzene, 4-phenoxybiphenyl, and combinations thereof.

Typical proportions of monomers may be used in a reaction scheme as are generally known in the art. For instance, the molar ratio of carbonyl halide monomer to reaction hydrogen-containing monomer can generally be from a about 5:1 to about 1:5, in some embodiments from about 1:3 to about 3:1, in some embodiments from about 1:2 to about 2:1, in some embodiments from about 1.5:1 to about 1:1.5, and in some embodiments from about 1.1:1 to about 1:1.1.

Catalysts for use in an electrophilic aromatic substitution reaction scheme can include those as are generally known in the art, e.g., Lewis acids. The Lewis acid is used in excess, based upon the molar amount of carbonyl groups or acid halide groups involved in the reaction. In general, a Lewis acid catalyst can be utilized in excess of from about 2 mol % to about 80 mol %, in some embodiments from about 5 mol % to about 30 mol %, based on the molar amount of carbonyl groups involved in the reaction scheme. For instance from about 0.01 moles to about 4 moles of Lewis Acid per mole of acid halide, in some embodiments from about 0.05 moles to about 2 moles of Lewis Acid per mole of acid halide. As is understood in the art, however, this value can vary depending upon the nature of the monomers utilized in the reaction scheme. For instance, if the monomers include basic groups, such as sulfone groups, it may be desirable to use a higher excess of Lewis acid.

Any Lewis acid as is generally known may be utilized, which includes essentially any compound capable of accepting a lone electron pair during the reaction. Examples can include, without limitation, $AlCl_3$, $AlBr_3$, $Sb_2Cl_5$, $Sb_2F_5$, $InCl_3$, $GaCl_3$, $BCl_3$, $BF_3$, $ZnCl_2$, $FeCl_3$, $SnCl_4$, $TiCl_4$, $MoCl_5$, etc.

Anhydrous inert solvents as are known can be utilized. For instance, polar solvents having a dielectric constant of about 2.5 or greater at 25° C. can be utilized, for instance from about 4.0 to about 25 at 25° C. including, without limitation, methylene chloride, carbon disulfide, 1,2-dichloroethane, 1,1,2,2-tetrachloroethane, 1,2-dichlorobenzene, 1,2,4-trichlorobenzene, 2-dichloroethane, as well as mixtures thereof.

While the reaction can generally be carried out in a temperature range of from about −60° C. to about 150° C., it will generally be desired to cool the reaction, for instance to a temperature of from about −50° C. to about 100° C., or from about −40° C. to about 50° C.

A nucleophilic aromatic substitution reaction scheme may alternatively be utilized to form the PAEKs. According to this reaction scheme a nucleophile of a first monomer can displace a good leaving group, e.g., a halide, of an aromatic ring. A reaction scheme generally includes the polycondensation of a dihydroxy compound with a dihalo compound according to the following general reaction scheme:

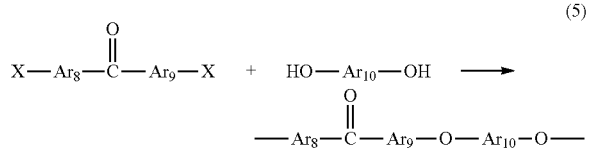
(5)

wherein X is a halogen and $Ar_8$, $Ar_9$, and $Ar_{10}$ are each aromatic radicals such as those of formula (IV) and/or formula (V) described above selected to include the repeat units of the desired PAEK.

Representative monomers for use in a nucleophilic aromatic substitution reaction scheme can include, without limitation, hydroquinone, 4,4'-dihydroxydiphenyl, 4,4'-dihydroxybenzophenone, 4,4'-dihydroxydiphenylether, 1,4-di-[4-(4-hydroxyphenoxy)benzoyl]benzene, 4,4'-di(4-hydroxyphenoxy)benzophenone, 4,4'-di[4-(4-hydroxyphenoxy)benzoyl]diphenyl, 1,5-dihydroxynaphthalene, 2,6-dihydroxynaphthalene, 2,7-dihydroxynaphthalene, 2,6- or 2,7-bis-(p-hydroxybenzoyl)-naphthalene, 2,5- or 2,7-bis(p-fluorobenzoyl)-naphthalene, 4,4'-difluorobenzophenone, 1,4-bis-(4-fluoro-benzoyl)-benzene, 4,4'-bis-(p-fluoro-benzoyl)-biphenyl, 4-(p-fluorophenoxy)-4'-(p-fluorobenzoyl)-biphenyl, etc. and mixtures thereof or a $C_1$-$C_6$-alkyl, $C_1$-$C_6$-alkoxy, aryl, chlorine or fluorine derivative thereof.

The nucleophilic aromatic substitution reaction can generally be carried out in an aprotic polar solvent in the presence of an anhydrous base as is generally known. For instance, an aprotic polar solvent can be used having the general formula:

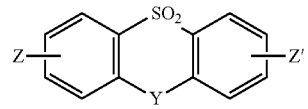

wherein Y is a chemical bond, oxygen or hydrogens bonded to the aromatic radical, and Z and Z' are each independently hydrogen or phenyl.

For example, the reaction scheme can utilize diphenyl sulfone as solvent with an anhydrous alkali metal carbonate or bicarbonate base may be utilized. The alkali metal of the carbonate or bicarbonate is not particular limited and may be selected from, for example, sodium, potassium, rubidium, or cesium. The reaction can generally be carried out at a reaction temperature of from about 150° C. to about 400° C., or from about 250° C. to about 400° C. in some embodiments or from about 250° C. to about 350° C. in some embodiments. The amount of solvent utilized is generally in the range of from about 5 moles to about 100 moles per mole of monomers reacted, or from about 5 moles to about 20 moles per mole of monomers reacted in some embodiments.

Molecular weight control schemes as are generally known can be utilized. For instance the reaction mixture can be formed to include unactivated or activated monohalo and/or mononitro compounds or corresponding monohydroxy compounds as is known.

Additional materials, in addition to the heteroaryl dispersant, can be included in an electrophilic substitution reaction or a nucleophilic substitution reaction scheme to affect the product as desired. For instance, end-capping compounds can be combined with the reaction mixture prior to, during, or following polymerization that can cap reactive end groups of the formed polymer. Capping groups as may be utilized generally exhibit low reactivity and high thermal stability, e.g., benzene, biphenyl ether, alkyl, etc. An end capping compound can include a suitable end capping group and a reactive functionality. Nucleophilic and/or electrophilic capping compounds such as and without limitation, benzoyl chloride, xylene, phenol, 4-fluorobenzophenone, 4-chlorobiphenyl, 4-phenoxybenzophenone, 4-(4-phenoxyphenoxy) benzophenone, biphenyl 4-benzenesuphonylphenyl phenyl ether, benzenesulphonyl chloride, alkyl halides (e.g., methyl chloride), etc. can be utilized.

A diluent can also be utilized in a reaction scheme, if desired. For instance, a non-protic diluent that is inert towards Friedel-Crafts reactions can be utilized. Diluents can include, for example, dichloromethane, carbon disulfide, o-dichlorobenzene, 1,2,4-trichlorobenzene, o-difluorobenzene, cyclohexane, and mixtures thereof. The presence of a diluent is not a requirement, however, and may be avoided in some embodiments so as to simplify purification of the formed polymer.

Following polymerization, the polymer may be in the form of a suspension of particles due to the presence of the heteroaryl compound in the reaction scheme. While the particles may be generally spherical in one embodiment, this is not necessarily the case, and particles of different morphologies may be formed. For instance, the particles can be rod shaped, plate-like, amorphous, ovoid, amorphous, or other non-spherical shapes. In one embodiment, the particles can be non-spherical and have an aspect ratio of greater than about 1.3, greater than about 1.5, or greater than about 2 in some embodiments. Aspect ratio of the particles can be determined as the longest cross sectional dimension of the particle (i.e., the length of the particle) divided by a cross sectional dimension that is at right angles to the length (i.e., the width of the particle.

The particle size can be affected by the amount of heteroaryl dispersant utilized as well as through the solvent concentration, stirring characteristics, temperature parameters, and so forth. In one embodiment, the particle suspension can include particles having an average size (i.e., cross-sectional dimension, such as diameter) of about 5 millimeters or less, for instance from about 0.1 micrometers to about 1000 micrometers, or from about 1 micrometer to about 500 micrometers in some embodiments, or from about 10 to about 300 micrometers in some embodiments.

Regardless of the particular method employed, the resulting PAEK typically has a number average molecular weight ($M_n$) of about 2,000 grams per mole or more, in some embodiments from about 4,000 grams per mole or more, and in some embodiments, from about 5,000 to about 30,000 grams per mole. Of course, it is also possible to form polymers having a lower molecular weight, such as less than about 2,000 grams per mole, using the method of the present invention. For instance, a PAEK may have a number average molecular weight of from about 2,000 grams per mole to about 150,000 grams per mole, in some embodiments.

The melting point of the polymer composition may also range from about 250° C. to about 400° C., in some embodiments from about 270° C. to about 380° C., and in some embodiments, from about 300° C. to about 360° C. Likewise, the crystallization temperature may range from about 200° C. to about 400° C., in some embodiments from about 225° C. to about 350° C., and in some embodiments from about 250° C. to about 320° C. The melting and crystallization temperatures may be determined by differential scanning calorimetry ("DSC") as is known in the art. The melting temperature is the differential scanning calorimetry (DSC) peak melt temperature as determined by ISO Test No. 11357. The crystallization temperature is determined from the cooling exotherm in the cooling cycle. Under the DSC procedure, samples may be heated and cooled at 20° C. per minute as stated in ISO Standard 10350 using DSC measurements conducted on a TA Q2000 Instrument.

If desired, the resulting polymer may also be combined with a wide variety of additives. For example, a filler material may be incorporated into a polymer composition to enhance strength. Examples of suitable filler materials may include, for instance, fibrous reinforcing materials, such as glass fibers, silica-alumina fibers, carbon fibers, etc.; particle fillers, such as calcium carbonate, talc, mica, clay, glass beads etc.; and so forth. When employed, such fillers may, for example, constitute from about 10 wt. % to about 90 wt. %, in some embodiments from about 20 wt. % to about 60 wt. %, and in some embodiments, from about 25 wt. % to about 55 wt. % of the composition. Other known additives, such as antioxidants, heat stabilizers etc., may also be employed.

Fillers may be incorporated into a composition following the polymerization reaction or can be added to a reaction mixture, as desired and depending upon the nature of the filler. For instance, in one embodiment from about 0.01 wt. % to about 60 wt. % or from about 0.1 wt. % to about 50 wt. %, based upon the weight of the formed PAEK, of an inert filler or of a compound that can be converted to an inert filler during the workup of the polymer, can be including in the reaction mixture prior to or during the polymerization reaction. Such fillers can include amphoteric metal oxides or derivatives thereof. For example, oxides, alkoxides, or hydroxides of aluminum, double salts of alkali metals or alkaline earth metals with aluminum, aluminosilicates, and/or alumina are encompassed.

Other additives that can be included in a thermoplastic composition in conjunction with the PAEK can encompass, without limitation, antimicrobials, lubricants, pigments or other colorants, impact modifiers, antioxidants, stabilizers (e.g., heat stabilizers and/or UV stabilizers), surfactants, flow promoters, solid solvents, and other materials added to enhance properties and processability as are known. Such optional materials may be employed in a thermoplastic composition in conventional amounts and according to conventional processing techniques.

A thermoplastic composition may include the PAEK blended with other polymers. Polymer blends can include, for instance, blends of different PAEKs as well as blends of one or more PAEKs with other polymers such as, without limitation, liquid crystal polymers, fluoropolymers, polyarylene sulfides (e.g., polyphenylene sulfide), polyethylene, polyethyleneimine, and so forth.

Conventional shaping processes can be used for forming articles out of a thermoplastic composition including one or more PAEK as described such as, without limitation, extrusion, injection molding, blow-molding, thermoforming, foaming, compression molding, hot-stamping, fiber spinning and so forth.

The present invention may be better understood by reference to the following example.

EXAMPLE 1

A PEKK polymer was formed by use of the components described in the following table.

| Component | Mol. Wt. ($M_n$) | Moles | Grams |
| --- | --- | --- | --- |
| Diphenyl ether (2% Out of balance) | 170.21 | 0.1801 | 30.66 |
| Terephthaloyl chloride | 203.02 | 0.1412 | 28.68 |
| Isophthaloyl chloride | 203.02 | 0.0351 | 7.14 |
| Benzoyl chloride | 140.57 | 0.008829 | 1.241 |
| Aluminum chloride (anhydrous) | 133.34 | 0.749 | 100 |
| Cyanuric acid | 129.07 | 0.0323 | 4.17 |
| Methylene chloride (anhydrous) | — | — | 800 |

The solids content was 17%. The reactor was a 3 necked flask with agitation at 300 rpm. The heating profile was −20° C. to −30° C. for 0.5 hours, 0° C. to 20° C. for 2 hours and room temperature (about 20° C.) for 9.5 hours. The theoretical yield was 26 grams.

The reaction was carried out under nitrogen in a dry ice (850 g) an isopropanol bath (1800 mL). Diphenyl ether (2 mol % out of balance with respect to the acid chlorides), the acid chlorides and the cyanuric acid were added to the flask and the solvent was then added while stirring at 100 rpm. The mixture was cooled to at least −20° C. Following, the aluminum chloride at ambient temperature was added with 50 mL of solvent as a rinse. This mixture was again cooled to −20° C. The addition of the aluminum chloride was done gradually as the addition caused a large exotherm in the reaction.

Stirring was increased to 300 rpm and the temperature was held at −20° C. for 0.5 hours.

Following, the cooling bath was replaced with ice-cold water (3 L bath) and the temperature gradually rose over a two hour period from 0° C. to approximately room temperature. The reaction was continued at room temperature (approximately 20° C.) for 9.5 hours.

The reaction mixture was a suspension of fine particles. The reaction mixture was viscous enough to be efficiently stirred by conventional lab agitators.

The mixture was then quenched by pouring into a 2 L beaker containing 1 L of water maintained at 0° C. and stirred at 300 rpm, keeping the temperature below 20° C. The decomplexation of unreacted aluminum residues is an exothermic reaction, so the reaction mixture was gradually added to the cold water in order to prevent the methylene chloride from flashing. After 30 min to 1 hour of stirring the white solid was filtered through a Buchner funnel.

The product was washed in 1 L of 4N methanolic HCl for 2 hours in a 5 L beaker while stirring at 100 rpm at room temperature and then filtered through a Buchner funnel. A second wash was in 2 L of 2N KOH (aqueous) heated to 90-100° C. for 2 hours in a 5 L beaker while stirring at 100 rpm. The product was filtered through a Bucher funnel. A third wash with 2 L water (DI) for 30 minutes was carried out followed by filtering through a Buchner funnel.

The product was stabilized by use of concentrated formic acid soaking for at least 2 hours followed by vacuum drying at 170° C. The final product yield was about 90% of the theoretical.

FIG. 1 is a scanning electron micrograph of the product. The SEM characterization revealed that the particles were irregularly formed spheres with some aggregation. The particle size could be controlled by residence time in the reactor and cyanuric acid concentration and the total monomer concentration used.

Physical characteristics of the product are described in the below table.

| Characteristic | Units | Before formic acid treatment | After formic acid treatment |
| --- | --- | --- | --- |
| Absorbance (455 nm) | NA | 0.43 | 0.18 |
| Thermal gravimetric analysis | ° C. | 521 | 570 |
| Crystallization Temperature | ° C. | 288 | 280 |
| Melt Temperature ($T_m$) | ° C. | 339 | 349 |
| $H_c$ | J/g | 30.73 | 41.42 |
| $X_c$ | % | 23.64 | 31.09 |

COMPARATIVE EXAMPLE 1

A similar PEKK reaction was carried out as explained in EXAMPLE 1, but without the addition of any cyanuric acid as a dispersant. The reaction product gelled into a sticky mass at high conversion. The reaction could not be poured as a slurry into water for decomplexation of the catalyst. Instead, water was added to the reactor and the polymer recovery and subsequent purification was attempted. The product was in the form of large solid chunks and as a result purification and washing was very difficult and required mechanical size-reduction. Due to the gelation of the product, the subsequent purification was difficult and this compromised the purity of the polymer. An unground sample of the polymer following the purification process did not show any melting peak, perhaps due to crosslinking of the polymer during the test due the high concentration of the metallic catalyst residues and/or the inefficient stabilization of the unstable endgroups by using formic acid treatment.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a polyaryletherketone, the method comprising:

supplying one or more monomers to a reactor vessel to form a reaction mixture, wherein the one or more monomers are precursors for the polyaryletherketone, and at least one of the one or more monomers is a halide-containing monomer;

introducing a heteroaryl compound into the reactor vessel, wherein the heteroaryl compound has the following Formula (I):

or a salt, derivative or adduct thereof, wherein, the ring is a 6-membered aromatic ring wherein $A_1$, $A_2$, $A_3$, $A_4$, $A_5$, and $A_6$ are each independently carbon, nitrogen or oxygen, with the proviso that at least 3 of $A_1$, $A_2$, $A_3$, $A_4$, $A_5$, and $A_6$ are carbon atoms, wherein each nitrogen is optionally oxidized, and wherein the ring may be optionally fused or linked to a 5- or 6-membered aryl, heteroaryl, cycloalkyl, or heterocyclyl;

$R_1$ is acyl, acyloxy, acylamino, alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycyloxy;

m is from 0 to 4; and the one or more monomers reacting with one another in the presence of the heteroaryl compound to form the polyaryletherketone.

2. The method of claim 1, wherein the heteroaryl compound has a molecular weight of about 2,000 grams per mole or less.

3. The method of claim 1, wherein the heteroaryl compound comprises a triazene ring.

4. The method of claim 3, wherein the heteroaryl compound has the general structure provide in Formula (II) or Formula (III) or mixtures thereof:

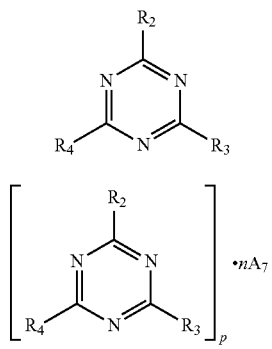

wherein,

R$_2$, R$_3$, R$_4$ are, independently, hydrogen; C$_1$-C$_8$ alkyl; C$_5$-C$_{16}$-cycloalkyl or alkylcycloalkyl, optionally substituted with a hydroxy or a C$_1$-C$_4$ hydroxyalkyl; C$_2$-C$_8$ alkenyl; C$_1$-C$_8$ alkoxy, acyl, or acyloxy; C$_6$-C$_{12}$-aryl or arylalkyl; OR$_5$ or N(R$_5$)R$_6$, wherein R$_5$ is hydrogen, C$_1$-C$_8$ alkyl, C$_5$-C$_{16}$ cycloalkyl or alkylcycloalkyl, optionally substituted with a hydroxy or a C$_1$-C$_4$ hydroxyalkyl, C$_2$-C$_8$ alkenyl, C$_1$-C$_8$ alkoxy, acyl, or acyloxy, or C$_6$-C$_{12}$ aryl or arylalkyl; and R$_6$ is identical to R$_5$ or O—R$_5$;

p is from 1 to 4;

n is from 1 to 4;

A$_7$ is an acid that can form adducts with triazine compounds of the formula III.

5. The method of claim 4, wherein A$_7$ is acetic acid or hydrochloric acid.

6. The method of claim 1, wherein the heteroaryl compound comprises cyanuric acid, melamine triacetate, or melamine hydrochloride or mixtures thereof.

7. The method of claim 1, wherein the heteroaryl compound is introduced into the reactor vessel is an amount of from about 0.05 moles to about 5 moles of the heteroaryl compound per mole of the halide-containing monomer.

8. The method of claim 1, wherein the polyaryletherketone has the general formula of Formula (IV) or Formula (V):

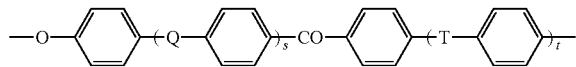

wherein Q and T are each independently —O— or —CO—;

s and t are each independently 0, 1, 2, or 3; or

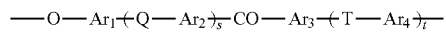

wherein Ar$_1$, Ar$_2$, Ar$_3$, Ar$_4$ are each independently m-phenylene, p-phenylene, biphenylene or naphthylene or a substituted or derivative thereof;

Q and T are each independently —O— or —CO—;

s and t are each independently 0, 1, 2, or 3.

9. The method of claim 1 wherein the method comprises an electrophilic aromatic substitution reaction to form the polyaryletherketone.

10. The method of claim 9, wherein the reaction equation is one of equation (1)-(3):

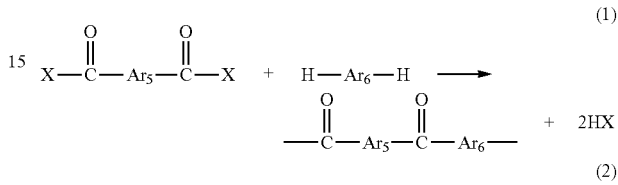

wherein X is a halogen and Ar$_5$, Ar$_6$, and Ar$_7$ are each divalent aromatic radicals.

11. The method of claim 10, wherein one of the monomers is an acid chloride that includes a divalent aromatic radical.

12. The method of claim 11, wherein one of the monomers is diphenyl ether, 4,4'-diphenoxybenzophenone, 1,4-diphenoxybenzene, or 4-phenoxybiphenyl.

13. The method of claim 9, wherein the electrophilic aromatic substitution reaction is carried out in the presence of a Lewis acid catalyst.

14. The method of claim 1, wherein the method comprises a nucleophilic aromatic substitution reaction to form the polyaryletherketone.

15. The method of claim 14, wherein the one or more monomers comprise a dihydroxy compound and a dihalo compound.

16. The method of claim 14, wherein the nucleophilic aromatic substitution reaction is carried out in the presence of an aprotic polar solvent and an anhydrous base.

17. The method of claim 1, further comprising introducing an end-capping compound to the reaction vessel.

18. The method of claim 1, wherein the polyaryletherketone is in the form of particles.

19. The method of claim 18, wherein the particles are non-spherical particles.

20. The method of claim 19, wherein the particles have an aspect ratio greater than about 1.3.

21. The method of claim 18, wherein the particles have an average size of about 5 millimeters or less.

* * * * *